United States Patent [19]
Guillemette

[11] Patent Number: 5,667,818
[45] Date of Patent: Sep. 16, 1997

[54] EXTRUSION SYSTEM WITH BALANCED FLOW PASSAGE

[76] Inventor: A. Roger Guillemette, 10 Pike St., West Warwick, R.I. 02893

[21] Appl. No.: 625,779

[22] Filed: Mar. 29, 1996

Related U.S. Application Data

[63] Continuation of Ser. No. 148,009, Nov. 5, 1993, abandoned.
[51] Int. Cl.⁶ ............................................. B29C 47/26
[52] U.S. Cl. ........................... 425/133.1; 264/173.16; 264/514; 425/380; 425/462; 425/467
[58] Field of Search ............................... 425/133.1, 462, 425/467, 380; 264/173, 174, 177.16, 514, 173.11, 173.12, 173.16

[56] References Cited

U.S. PATENT DOCUMENTS

| | | | |
|---|---|---|---|
| 3,308,508 | 3/1967 | Schrenk | 425/133.1 |
| 3,327,349 | 6/1967 | Lennox | 425/133.1 |
| 3,334,382 | 8/1967 | Lefevre | 425/133.1 |
| 3,365,750 | 1/1968 | Donald | 425/133.1 |
| 3,479,425 | 11/1969 | Lefevre et al. | 425/133.1 |
| 3,947,173 | 3/1976 | Dougherty | 425/133.1 |
| 4,120,633 | 10/1978 | Leuerherm | 425/133.1 |
| 4,125,585 | 11/1978 | Rosenbaum | 425/133.1 |
| 4,134,952 | 1/1979 | Yoshitawa et al. | 425/133.1 |
| 4,248,824 | 2/1981 | Hattop | 264/174 |
| 4,279,851 | 7/1981 | Lord et al. | 264/174 |
| 4,548,569 | 10/1985 | Pitigliano et al. | 425/133.1 |
| 4,657,497 | 4/1987 | Delennau et al. | 425/133.1 |
| 4,657,718 | 4/1987 | Sicka et al. | 264/174 |
| 4,798,526 | 1/1989 | Briggs et al. | |
| 5,108,683 | 4/1992 | Anand | |
| 5,183,669 | 2/1993 | Guillemette | |

*Primary Examiner*—Jay H. Woo
*Assistant Examiner*—Joseph Leyson
*Attorney, Agent, or Firm*—Perman & Green

[57] ABSTRACT

A crosshead die for an extrusion system provides a balanced, even flow of molten material around a circumference. The die has a cylindrical body with opposite first and second ends, an outer wall, a horizontal centerline and a vertical centerline. The die further includes a reduced diameter end portion at the second end thereof. The reduced diameter end portion includes an axial bore. The cylindrical body further has a recessed surface in the first end, and a circular groove in the recessed surface. The groove has an inner edge and an outer edge and the outer edge includes two inwardly curved blending wedges which are positioned in opposed relation on the vertical centerline. The inner edge of the groove merges into a frusto-conical inner wall which tapers axially inwardly and merges with the axial bore in the reduced diameter end portion. The inner edge of the groove has a lesser height than the recessed surface. The cylindrical body further includes a flow inlet on the outer wall which is aligned with the vertical centerline. The body further includes first and second symmetrical flow channels which extend into the body from the flow inlet. The flow channels angle outwardly from the vertical centerline toward the outer wall and then turn forwardly to open outwardly into the groove.

14 Claims, 6 Drawing Sheets

1

EXTRUSION SYSTEM WITH BALANCED FLOW PASSAGE

This application is a continuation of application Ser. No. 08/148,009 filed on Nov. 5, 1993, now abandoned.

BACKGROUND AND SUMMARY OF THE INVENTION:

The instant invention relates to extrusion systems, and more particularly to a crosshead die for a multiple-layer extrusion system.

In the manufacture of plastic-coated wire, rubber-coated wire, plastic tubing, or rubber tubing, molten plastic and/or rubber is extruded by means of a crosshead extrusion system which receives a stream of molten material and causes the molten material to be distributed around the circumference of a wire or tube. In this connection, a variety of crosshead devices have heretofore been known in the art. For example, the Guillemette U.S. Pat. No. 5,183,669 discloses a crosshead extruder system which is operative for applying a single layer of plastic onto a wire. It is also known in the art to simultaneously extrude more than one layer of plastic and/or rubber. Such a process is accomplished by means of multi-layer crosshead devices such as illustrated in the U.S. Pat. Nos. 5,108,683 to Anand, and Briggs et al No. 4,798,526. These devices utilize one or more crosshead dies which are sequentially mounted onto an extruder for co-extrusion of multiple layers. In this regard, it is well known in the crosshead art that it is extremely difficult to establish an even and balanced flow of molten plastic or rubber around the circumference of a wire or tube. For example, it is known that sharp turns in the material flow paths create "dead spots" in the crosshead in which plastic or rubber material stagnates and becomes overheated. When plastic or rubber overheats or "cooks", it turns black, and thereafter, when the burnt material makes its way back into the flow stream, it causes discolored specs in the coating. It is also known that splitting and reblending the material stream causes weld or joint lines wherein the extruded material is not evenly blended together. These flow problems are of particular interest in multiple-layer co-extrusion devices because there are multiple crosshead dies and multiple flowpaths for the layers of material being extruded. In many of the known crosshead dies, the balanced flow problems are exaggerated even further because of lengthened flow paths, and pressure drops in enlarged flow areas.

The instant invention provides a crosshead die for an extrusion system which achieves a completely uniform and balanced flow with no "dead spots", so that a consistent, even thickness of extruded material is distributed therearound. Briefly, the instant crosshead die comprises a cylindrical body having a first and second ends, a reduced diameter end portion at the second end thereof, and an axial bore which extends through the end portion. The cylindrical body further has a recessed surface in the first end thereof, and a circular groove in the recessed surface. The groove has an inner edge and an outer edge, and the outer edge includes two inwardly curved blending wedges which are positioned in opposed relation on a vertical centerline. The inner edge of the groove merges into a frusto-conical inner wall which tapers axially inwardly and merges with the axial bore in the reduced diameter end portion. The inner edge of the groove has a lesser height than the recessed surface. The cylindrical body further includes a concave flow inlet on the outer wall which is aligned with the vertical centerline. The body still further includes first and second symmetrical flow channels which extend into the body from the flow inlet and diverge outwardly from the vertical centerline toward the outer wall and then turn forwardly and open outwardly into the groove. The openings of the flow channels in the flow inlet are adjacent and they cooperate to form a natural wedge-shaped flow splitter in the flow inlet.

A second embodiment of the crosshead die is operative for use with large diameter wire or tubing wherein the axial bore of the die has a larger diameter. In this connection, it can be seen that the frusto-conical inner wall also has a larger end diameter. To accommodate the larger diameter bore and the wider taper of the inner wall, the flow inlet of the die is extended around the outer wall for approximately 10 degrees on each side of the vertical centerline and the flow channels extend into the body from the outer ends of the flow inlet. The spaced positions of the flow channels allow the channels to pass through the body without intersecting the inner frusto-conical wall. Since the openings of the flow channels are in spaced relation, a wedge-shaped flow splitter is provided in the flow inlet for dividing the flow evenly between the two flow channels.

A third embodiment of the crosshead die eliminates the reduced diameter end portion and incorporates a second groove in the second end surface for applying another layer of material. The inlet for second groove is positioned on the vertical centerline at the bottom of the die opposite the first inlet. The flow channels for the second groove diverge outwardly and then turn rearwardly to open into the second groove. The inner edge of the second groove merges into an outwardly tapered frusto-conical wall.

Accordingly, it is an object of the instant invention to provide a crosshead die which has a balanced and even flow of material without any dead spots.

It is another object to provide a flow splitter at the flow inlet of a crosshead die.

It is yet another object to provide wedge-shaped flow blenders in a circular flow groove of a crosshead die.

Other objects, features and advantages of the invention shall become apparent as the description thereof proceeds when considered in connection with the accompanying illustrative drawings.

DESCRIPTION OF THE DRAWINGS:

In the drawings which illustrate the best mode presently contemplated for carrying out the present invention.

3

Figure 13:
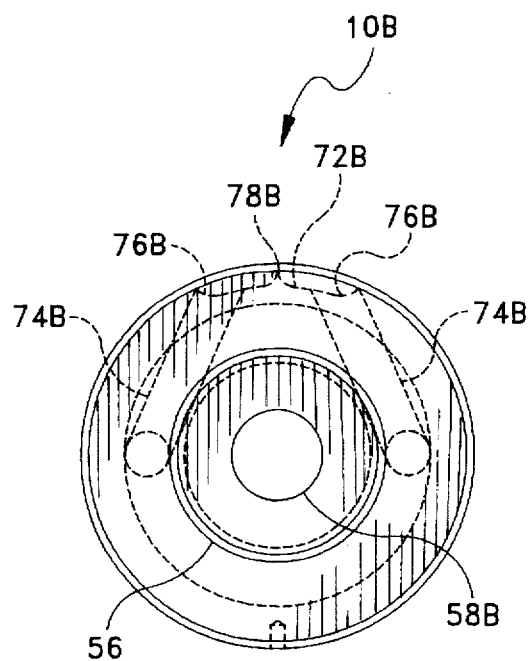
Figure 14:
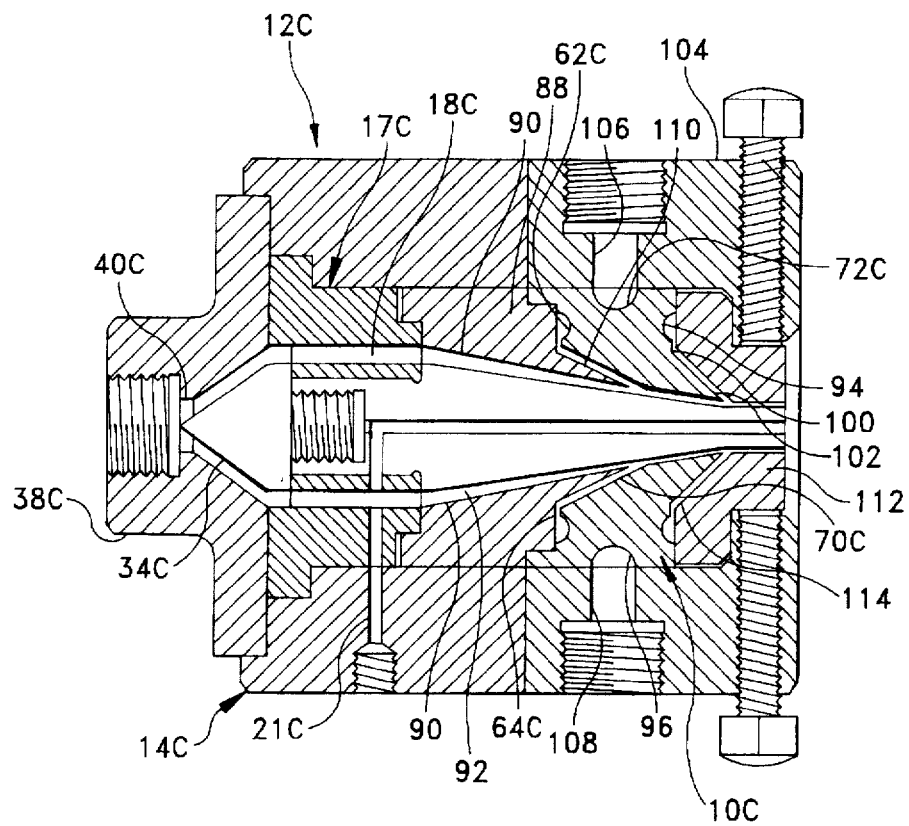
Figure 15:
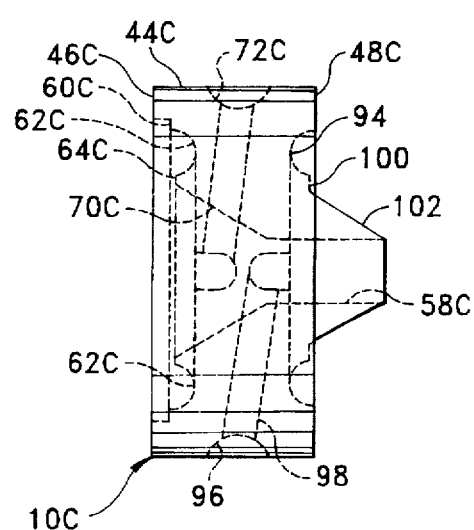

FIG. 13 is a rear view of said second embodiment;

FIG. 14 is a cross-sectional view of another multiple-layer extrusion system with a third embodiment of the instant crosshead die mounted therein; and FIG. 15 is a side view of said third embodiment.

DESCRIPTION OF THE PREFERRED EMBODIMENT:

Referring now to the drawings, a first embodiment of the instant crosshead die is illustrated and generally indicated at 10 in FIGS. 1–7. As will hereinafter be more fully described, the instant crosshead die 10 is operative for use in a multi-layer extrusion system which is generally indicated at 12 in FIG. 1. The extrusion system 12 is operative for forming a three-layered tube, and it comprises a body generally indicated at 14, a main bore 16 extending longitudinally through the body 14, a core tube and spider assembly 17 having an annular flow passage 18 for receiving a first stream of molten material, an upper radial passage 19 extending into the main bore 16 for introducing a second stream of molten material, a lower radial passage 20 for receiving an air inlet tube 21, an annular deflector, generally indicated at 22, which is mounted in the main bore 16, and a tip die generally indicated at 24, which is mounted at the front of the body 14. The deflector 22 includes a cylindrical surface 26 which snugly fits into the main bore 16, a recessed deflector surface 28 which cooperates with the main bore 16 to form an annular flow passage 30, and an axial bore 32 for receiving and supporting the core tube assembly 17 therein. The core tube assembly 17 includes a conical flow splitter 34 over which the first stream of molten material is received before flowing into the flow channel 18, and it further includes a beveled core tip 36. The extrusion system further includes a back plate 38 which is secured to the body 14 by a pin 39. The back plate 38 includes an axial inlet passage 40 which receives the first stream of molten material. The tip die 24 comprises a frusto-conical funnel wall 41 which is received over the beveled tip 36 of the core tube assembly 17. The beveled core tip 36 and the frusto-conical funnel wall 41 cooperate to form a second annular flow passage 42. As the first stream of molten material passes through the annular passage 18 in the core tube assembly 17, the second stream of molten material is introduced through its respective upper radial passage 19 wherein a second layer of material is deposited around the circumference of the first layer.

The instant crosshead die 10 is operative for applying a third layer of molten material around the second layer, and it comprises a cylindrical body generally indicated at 44 having opposite first and second ends 46 and 48, respectively, an outer wall 50, a horizontal centerline 52 and a vertical centerline 54. The die 10 further includes a reduced diameter end portion 56 at the second end 48, and an axial bore 58 which extends through the reduced diameter end portion 56. The cylindrical body 44 has a recessed surface 60 in the first end 46, and a circular groove 62 in the recessed surface 60. The groove 62 has an inner edge 64 and an outer edge 66 (See FIG. 6), and the outer edge 66 includes two inwardly curved blending wedges 68 (FIGS. 2 and 6) which are positioned in opposed relation on the vertical centerline 54. The inner edge 64 of the groove 62 merges into a frusto-conical inner wall 70 which tapers axially inwardly and merges with the axial bore 58 in the reduced diameter end portion 56. The cylindrical body 44 further includes a concave flow inlet 72 on the outer wall 50. It is pointed out that the flow inlet 72 is circumferentially aligned with the vertical centerline 54. The die 10 further includes first and second symmetrical flow channels 74 which extend into the body 44. The flow channels 74 diverge outwardly from the vertical centerline 54 toward the outer wall 50 so that they do not intersect with the frusto-conical inner wall 70. The openings 76 of the flow channels 74 are adjacent within the flow inlet and they cooperate to form a natural wedge-shaped flow splitter 78 in the flow inlet 72. The flow-splitter 78 is aligned along the vertical centerline 54 and it evenly divides the incoming flow stream into the symmetrical flow channels 74. When the flow channels 74 reach the horizontal centerline 52 within the body 44 they turn forwardly and open outwardly into the circular groove 62 thereby forming two separate symmetrical flow channels 74 extending from the flow inlet 72 to the circular groove 62. It is pointed out that the outward openings 80 (FIGS. 2 and 6) of the flow channels 74 are positioned in opposite relation along the horizontal centerline 52.

Referring now to FIGS. 1 through 4, it is pointed out that the inner edge 64 of the groove 62 has a lesser height than the recessed surface 60 so that molten material which is received into the groove 62 can flow over the inner edge 64 and onto the frusto-conical inner wall 70. It is further pointed out that the inner edge 64 also includes two raised lip areas 82 which are formed adjacent the flow channel openings 80. The raised lip areas 82 have a height which is greater than the normal height of the inner edge 64 but less than the height of the recessed surface 60. The raised lip areas 82 extend around the inner edge 64 for approximately 45 degrees on each side of the horizontal centerline 52. The purpose of the raised lip area 82 will be explained hereinafter.

Figure 1:
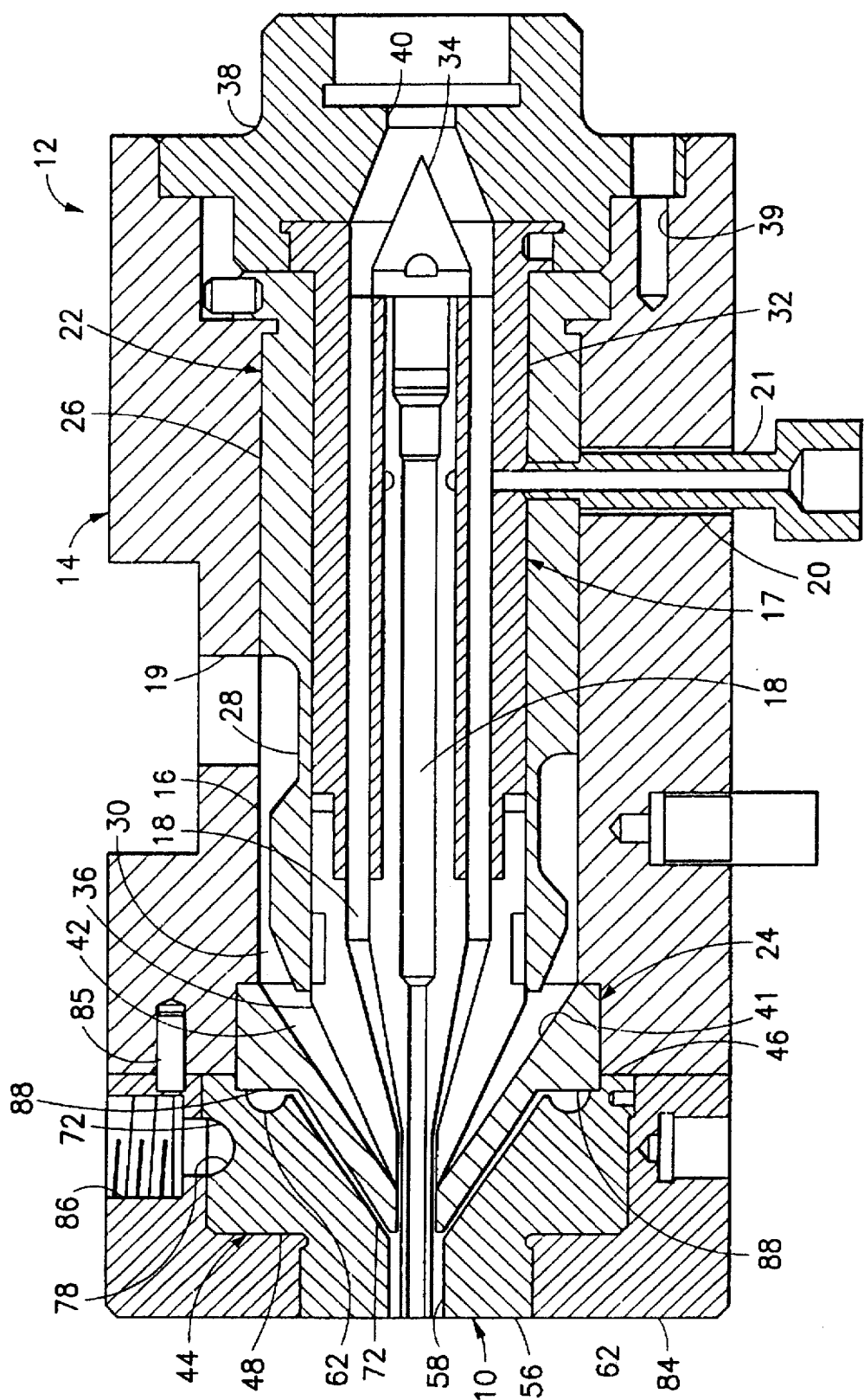
FIG. 1 is a cross-sectional view of a multiple-layer extrusion system with the crosshead die of the instant invention mounted therein.
Figure 2:
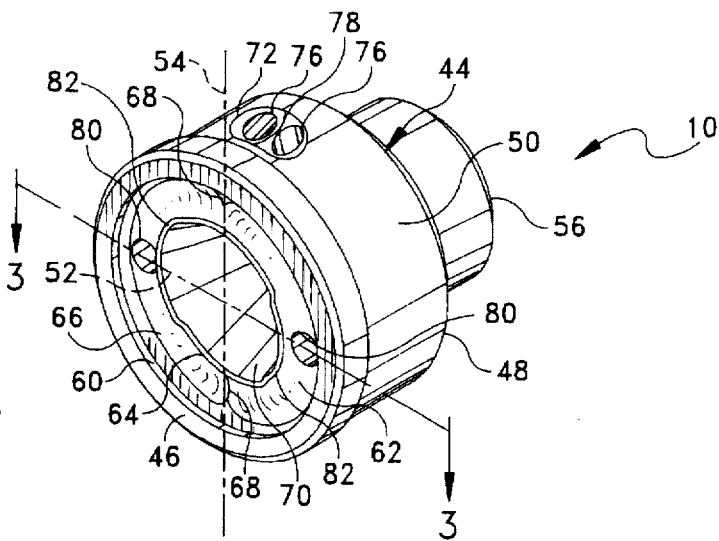
FIG. 2 is a perspective view of a first embodiment of the instant crosshead die.
Figure 3:
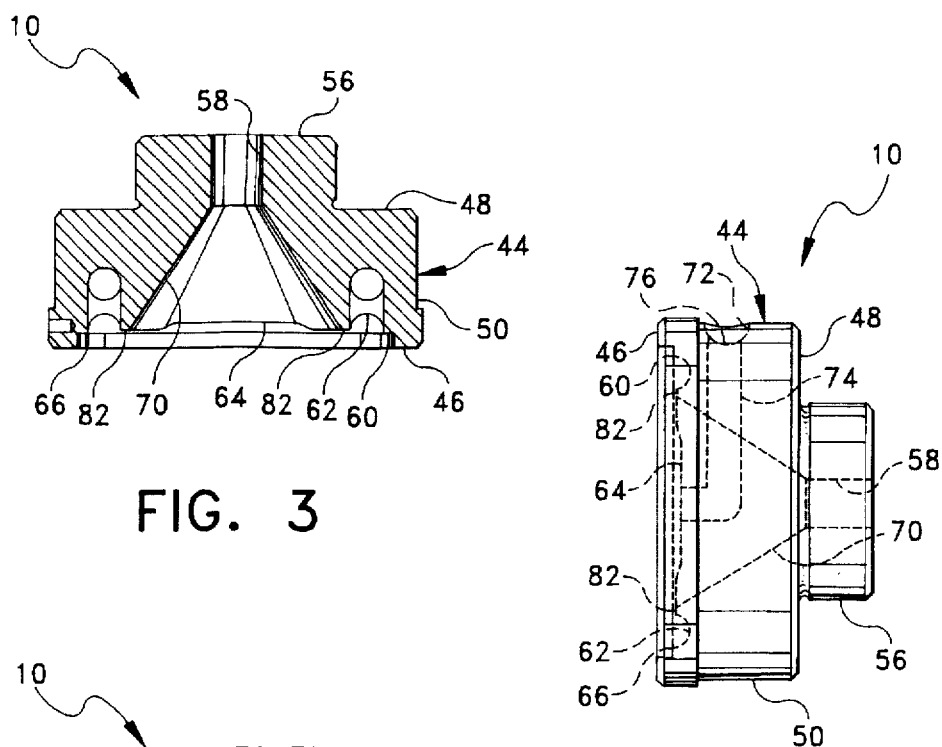
FIG. 3 is a cross-sectional view thereof taken along line 3—3 of FIG. 2.
Figure 4:
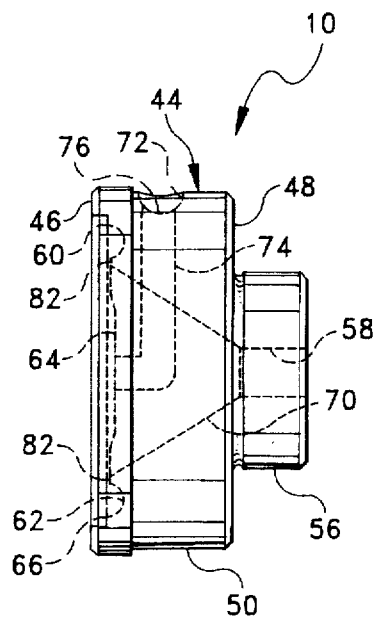
FIG. 4 is a side view of said first embodiment.
Figure 5:
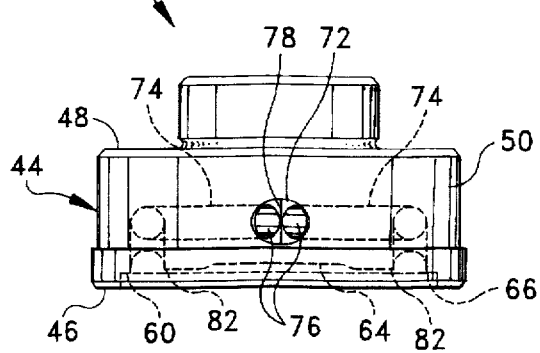
FIG. 5 is a top view of said first embodiment.
Figure 6:
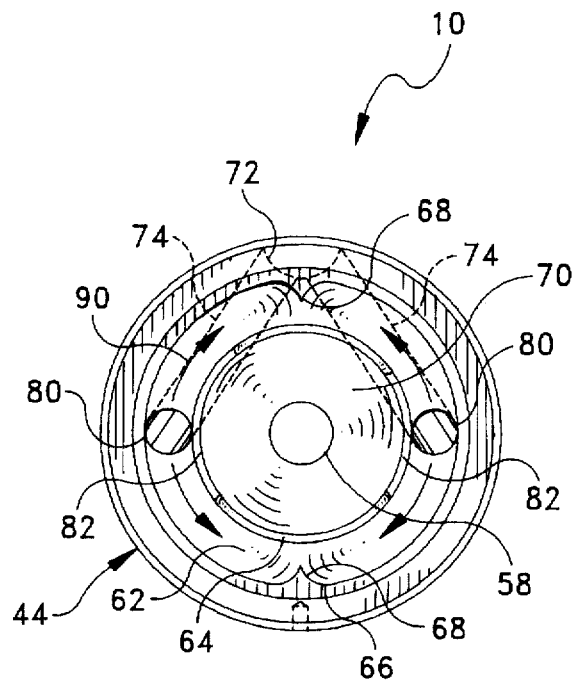
FIG. 6 is a front view of said first embodiment.
Figure 7:
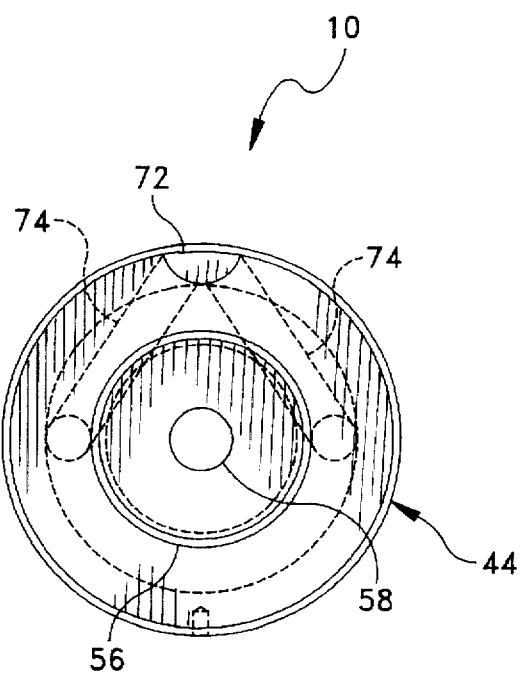
FIG. 7 is a rear view of said first embodiment.
Figure 8:
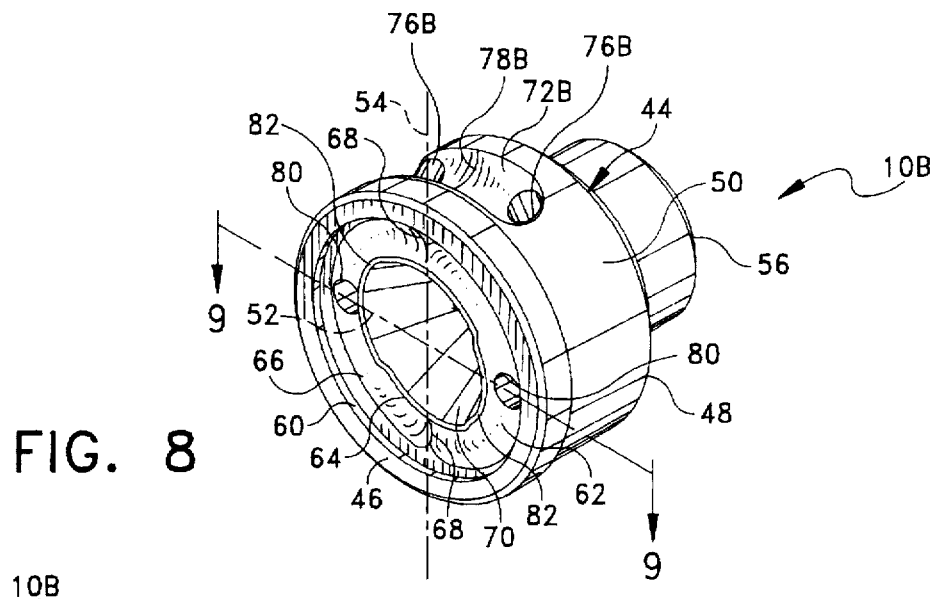
FIG. 8 is a perspective view of a second embodiment of the crosshead die.
Figure 9:
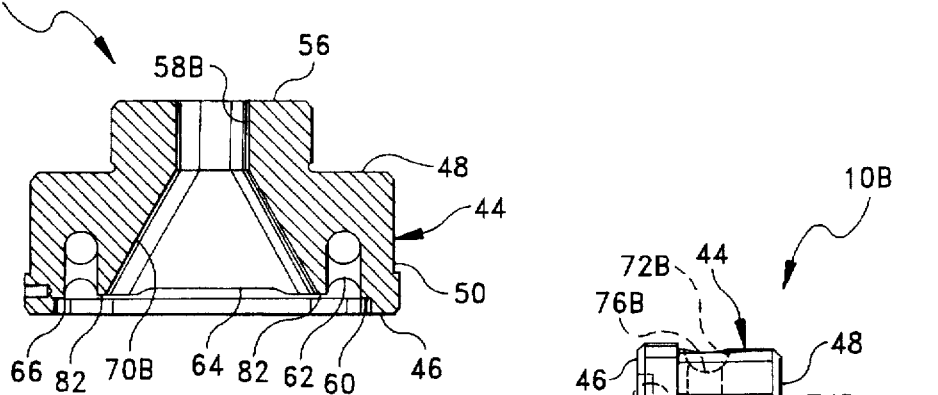
FIG. 9 is a cross-sectional view thereof taken along line 9—9 of FIG. 8.
Figure 10:
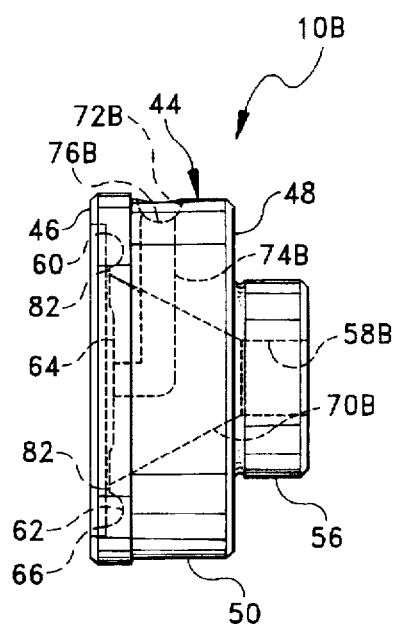
FIG. 10 is a side view of said second embodiment.
Figure 11:
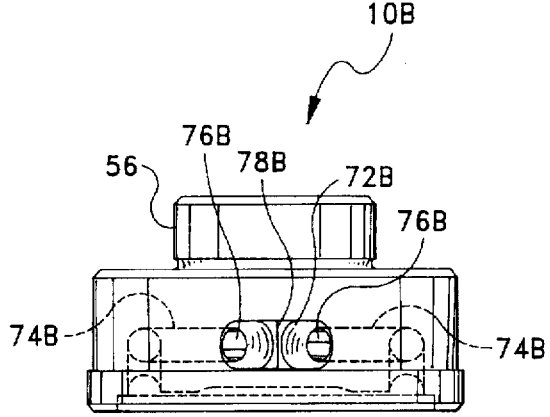
FIG. 11 is a top view of said second embodiment.
Figure 12:
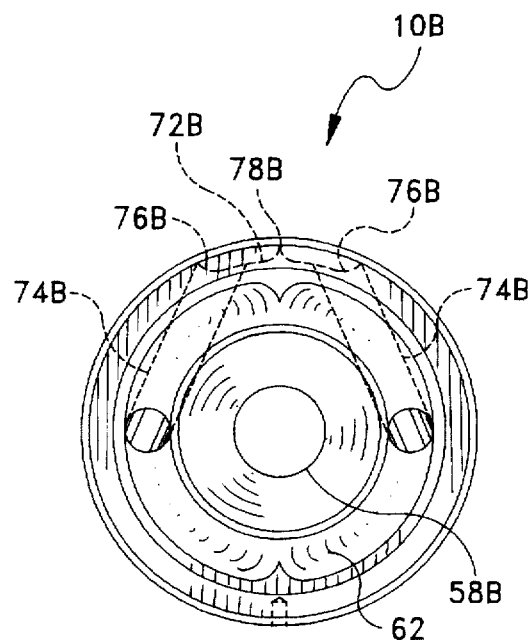
FIG. 12 is a front view of said second embodiment.

In use, the instant crosshead die 10 is mounted at the front of the body 14 of the extrusion system 12, as illustrated in FIG. 1, so that the axial bore 58 is co-axial with the main bore 16. In this connection, the die 10 is received into a circular die holder 84 which is securely fastened to the front of the body 14 by any suitable means such as pins 85. The die holder 84 includes a radial passage 86 for introducing a third stream of molten material to the flow inlet 72 of the die 10. The stream of molten material is introduced under pressure to the flow inlet 72 where the flow splitter 78 effectively divides the flow into two separate streams which then flow into the respective symmetrical flow channels 74. The two streams of molten material travel through the body 44 and then turn forwardly in the flow channels 74 and exit the flow channels 74 into the groove 62. It can be seen that the groove 62 cooperates with the flat end wall 88 of the tip die 24 to form an annular flow channel, and it can further be seen that the frusto-conical inner wall 70 of the die 10 cooperates with the tip die 24 to form a frusto-conical flow channel. As the two flow streams enter the groove 62 they are further divided into four streams (see arrows 90 in FIG. 6) which curve around the groove 62. When the four streams reach the opposing flow blenders 68, they are recombined into an annular flow stream which then flows over the inner edge 64 of the groove 62 and into the frusto-conical flow channel created between the die 10 and the tip die 24. It was found that high viscosity molten material tended to immediately flow over the portions of the inner edge 64 of the groove 62 which are directly adjacent to the flow outlets 80 before flowing completely around the groove 62. The instant invention addresses this problem by providing the raised lip areas 82 on the inner edge 64 of the groove 62 in order to slightly reduce the flow of material over those portions of the inner edge 64 which are directly adjacent to the flow openings 80. Accordingly, it can be seen that the material will tend to flow further around the groove 62 before spilling over the inner edge 64 so that a more even and balanced flow of material over the inner edge 64 is achieved.

A second embodiment of the die 10B is illustrated in FIGS. 8–13 and is operative for use with larger diameter wires or tubes wherein the diameter of the axial bore 58B is increased. It can be readily appreciated that when the diameter of the axial bore 58B is increased, the frusto-conical inner wall 70B tapers outwardly more and that the flow channels as illustrated in the first embodiment would then intersect with the inner wall 70B thereby making the die inoperable. To remedy the problem of a larger diameter bore 58B and inner wall 70B, the concave flow inlet 72B is widened to form an external groove which extends around the outer wall 50 for approximately 10 degrees on each side of the vertical centerline 54. The flow channels 74B then extend into the body 44 from the outer ends of the flow inlet 72B. This arrangement effectively spaces the channels 74B further apart (See FIGS. 12 and 13) and allows the enlarged frusto-conical inner wall 70B to extend through the body 44. Since the openings 76B of the flow channels 74B are in spaced relation, it can be seen that they no longer cooperate to form a natural flow splitter. Accordingly, the flow inlet 72B in the second embodiment is provided with a wedge-shaped flow splitter 78B for evenly dividing the flow between the two flow channels 74B. In all other aspects, the second embodiment of the co-extrusion die 10B is identical to the first embodiment 10.

A third embodiment of the crosshead die is generally indicated at 10C in FIGS. 14 and 15. The crosshead die 10C is operative in a multi-layer tubing extrusion system 12C for applying two layers of material. The extrusion system 12C is similar to the system shown in FIG. 1, however, the instant crosshead die 10C permits a simplified construction. The extrusion system includes a body 14C, and a core tube and spider assembly 17C having an annular flow passage 18C. The core tube and spider assembly 17C is held by a back plate 38C, and the first layer of material enters through an axial passage 40C and flows over the cone splitter 34C of core tube assembly 17C. The extrusion system 12C further includes a first wedge ring 88 having an inner wall 90 which cooperates with the core tube assembly 17C to form an annular flow passage 92. The crosshead die 10C is similar to the die 10A shown in FIGS. 1–7 however, the reduced diameter end portion 62 has been eliminated and a second groove 94 formed in the second end 48C thereof. A concave flow inlet 96 for the second groove 94 is positioned on the vertical centerline at the bottom of the die 10C, and first and second symmetrical flow channels 98 diverge outwardly toward the outer wall and then turn rearwardly to open into the groove 94. The openings for the flow channel 98 are aligned along the horizontal centerline. An inner edge 100 of the groove merges 94 into an outwardly tapered frusto-conical wall 102 which extends outwardly from the second end 48C of the die 10C. It can be seen in FIG. 15 that the two sets of flow channels 74 and 90 are slightly angled toward the front and back of the die 10C. This effectively shortens the flow path of the material even further and also prevents the flow channels 74 and 90 from intersecting with the body of the die 10C.

In use, the crosshead die 10C is mounted at the front end of the extrusion system 12C. The die 10C is received into a die holder 104 which is fastened to the body 14C by any suitable means. The die holder 104 includes an upper radial passage 106 for introducing a stream of material to the flow inlet 72C and a lower radial passage 108 for introducing a stream of material to the flow inlet 96. The inner wall 70C of the die 10C cooperates with the outer wall 110 of tip die 88 to form a second annular flow passage. Also received into the die holder 104 is a second tip die 112 having an inner wall 114 which cooperates with the groove 94 and outer wall 102 to form a third annular passage.

The material flow through both sets of flow channels 74C and 98 are essentially identical to that described for the first embodiment. Accordingly, it can be seen that the die 10C, in conjunction with the two tip die, 88 and 112 is operative for applying two layers of material within a very short travel distance. It is to be understood that this embodiment 10C also utilizes the concept flow blenders 68 even though they are readily visible from the illustrates.

While the instant crosshead dies 10, 10B and 10C are shown in connection with two very specific types of tube extrusion systems 12 and 12C, it is to be understood that the inventive concepts of instant die 10 can be readily modified for incorporation into other various and diverse types of extrusion systems so that the benefits of balanced and even flow achieved in the instant invention can be obtained with virtually any multi-layer extrusion system.

It can therefore be seen that the instant invention provides a unique co-extrusion die 10 which effectively balances material flow and evenly distributes the material around the circumference of a wire. The adjacent entrance positions of the flow channels 74 in the first embodiment create a natural flow splitter 78 which evenly distributes the material flow into symmetric flow channels 74. The internal flow channels 74 quickly and directly move the plastic to the grooved channel 62 for further distribution. The flow blenders 68 in the groove channel 62 effectively re-blend the separated flow streams into a continuous annular flow thereby eliminating weld lines in the finished product. The slightly raised lip areas 82 of the inner edge 64 reduce the tendency of the material to flow over the inner edge 64 of the groove 62 at a faster rate adjacent the flow outlets 80 thereby balancing the flow of material over the circumference of the inner edge 64. In the second embodiment, the flow inlet is widened to form a short groove 72B, and the flow splitter 78B evenly divides the flow between the two flow channels 74B. The spaced positions of the flow channels 74B prevent the channels 74B from intersecting with the inner frusto-conical wall 70B as they pass through the body 44 of the die 10B. For these reasons, the instant invention is believed to represent a significant advancement in the art which has substantial commercial merit. In the third embodiment 10C, two grooves are provided two layers for quickly and efficiently extruding two material layers over a core layer in a very short distance.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. In an extrusion die assembly, used for extruding molten plastic, said die assembly consisting of an assembly of components, a passage constructed in the components of the die assembly, providing a balanced flow throughout the flow path of the die assembly comprising:

a component in which is housed the passage, said passage having upstream and downstream ends relative to the direction of plastic flow;

an inlet constructed in the component to form an opening in the component to provide access to the passage, said inlet communicating with a source of flowable plastic to receive said plastic therefrom;

at least one pair of first and second flow channels constructed in the component in communication with the inlet, said channels forming a joint at the inlet and extending downstream within the component;

a distribution groove, constructed within the component generally transverse to the direction of plastic flow, said groove forming a chamber to receive flowing plastic, said groove having first and second inlets positioned symmetrically in the chamber and communicating with said first and second channels respectively to receive flowing plastic therefrom, said groove having a downstream edge communicating with an annular outlet to allow flowing plastic to escape therefrom, said groove further comprising a pair of blending means to direct the flow of plastic towards the downstream edge, said blending means positioned symmetrically in the chamber equidistant from the first and second groove inlets; and a generally conical extrusion channel constructed in the component downstream of the distribution groove to receive flowing plastic escaping from the annular outlet of the groove.

2. In an extrusion die assembly, used for extruding flowing plastic, said die assembly consisting of an assembly of components, a passage constructed in the components of the die assembly, providing a balanced flow throughout the flow path of the die assembly as described in claim 1, further comprising dividing means at the joint to provide a balanced distribution of the plastic flow between the first and second channels.

3. In an extrusion die assembly, used for extruding flowing plastic, said die assembly consisting of an assembly of components, a passage constructed in the components of the die assembly, providing a balanced flow throughout the flow path of the die assembly as described in claim 1, further comprising means on said downstream edge to restrict the flow of plastic in the area of the groove inlets from flowing directly into the annular outlet.

4. In an extrusion die assembly, used for extruding flowing plastic, said die assembly consisting of an assembly of components, a passage constructed in the components of the die assembly, providing a balanced flow throughout the flow path of the die assembly as described in claim 1, wherein the components are substantially cylindrical and are assembled in axial alignment.

5. In an extrusion die assembly, used for extruding flowing plastic, said die assembly consisting of an assembly of components, a passage constructed in the components of the die assembly, providing a balanced flow throughout the flow path of the die assembly as described in claim 2 wherein the groove chamber and the extrusion channel are formed by the cooperative engagement of adjacent components.

6. In an extrusion die assembly, used for extruding flowing plastic, said die assembly consisting of an assembly of components, a passage constructed in the components of the die assembly, providing a balanced flow throughout the flow path of the die assembly as described in claim 1, wherein the component comprises a cylindrical body having first and second end faces having the distribution groove constructed in said first face and said component including a second passage comprising:

a second inlet constructed in the component to form an opening in the component to provide access to the second passage, said second inlet communicating with a second source of flowable plastic to receive said plastic therefrom;

a second pair of first and second flow channels constructed in the component in communication with the second inlet, said second pair of channels forming a joint at the second inlet and said second pair of channels extending downstream within the component;

a second distribution groove, constructed on the second face of the component generally transverse to the direction of plastic flow, said second groove forming a second chamber to receive flowing plastic, said second groove having first and second inlets positioned symmetrically in the second chamber and communicating with said second pair of first and second channels to receive flowing plastic therefrom, said second groove having a downstream edge communicating with an annular outlet to allow flowing plastic to escape therefrom, said second groove further comprising a pair of blending means to direct the flow of plastic towards the downstream edge, said blending means positioned symmetrically in the chamber equidistant from the first and second groove inlets; and a second annular generally conical extrusion channel constructed in the component downstream of the second distribution groove to receive flowing plastic escaping from the annular outlet of the second distribution groove, said second extrusion channel merging with the extrusion channel.

7. In an extrusion die assembly, used for extruding flowing plastic, said die assembly consisting of an assembly of components, a passage constructed in the components of the die assembly, providing a balanced flow throughout the flow path of the die assembly as described in claim 6, further comprising dividing means at the joint to provide a balanced distribution of the plastic flow between the second pair first and second channels.

8. In an extrusion die assembly, used for extruding flowing plastic, said die assembly consisting of an assembly of components, a passage constructed in the components of the die assembly, providing a balanced flow throughout the flow path of the die assembly as described in claim 1, further comprising means on said downstream edge of said second distribution groove to restrict the flow of plastic in the area of the distribution groove inlets from flowing downstream thereof.

9. An extrusion die assembly through which a stream of flowing plastic is processed said die assembly having a longitudinal axis comprising:

a cylindrical body having opposite first and second ends and an outer wall, said cylindrical body having an axial bore extending therethrough;

said cylindrical body having a flow inlet constructed in the outer wall to receive the plastic and first and second flow channels communicating with the flow inlet, said channels constructed to direct the plastic through the body;

said cylindrical body further being constructed with a substantially circular distribution groove in the first end extending generally transverse to the axis of the die and having first and second groove inlets symmetrically placed within the distribution groove and communicating respectively with said first and second flow channels to receive flowing plastic therefrom, said groove having an outer edge and an inner edge relative to the axis of the die, said outer edge including two blending wedges extending inward into the distribution groove to direct flowing plastic toward the inner edge, said blending wedges arranged symmetrically equidistant from the groove inlets, said inner edge merging into a frusto-conical inner wall which tapers axially inward and merges with the axial bore; and a mating component having a radially extending engagement surface which engages the first end of the body to form a flow chamber with the distribution groove and a frusto-conical engagement surface to form an annular frusto-conical extrusion channel with the frusto-conical inner wall to receive the flowing plastic from the distribution groove.

10. An extrusion die assembly through which a stream of flowing plastic is processed as described in claim 9 further comprising means at the flow inlet to divide the flow of plastic substantially balanced between the flow channels.

11. An extrusion die assembly through which a stream of flowing plastic is processed as described in claim 9 further comprising means constructed on the inner edge of the distribution groove to restrict the flow of plastic towards the inner wall in area of the groove inlets from flowing downstream thereof.

12. An extrusion die assembly through which a stream of flowing plastic is processed as described in claim 9 further comprising:

said cylindrical body having a second flow inlet constructed in the outer wall to receive plastic and third and fourth flow channels communicating with the second flow inlet, said flow channels constructed to direct the plastic through the body;

said cylindrical body further being constructed with a second substantially circular distribution groove in the second end extending generally transverse to the axis of the die and having third and fourth groove inlets symmetrically placed within the distribution groove and communicating respectively with said third and fourth flow channels to receive flowing plastic therefrom, said second distribution groove having an outer edge and an inner edge relative to the axis of the die.

said outer edge including two blending wedges extending inward into the second distribution groove to direct flowing plastic toward the inner edge, said blending wedges arranged symmetrically equidistant from the groove inlets, said inner edge merging into a frusto-conical inner wall which tapers axially inward and merges with the axial bore; and a second mating component having a radially extending engagement surface which engages the first end of the body to form a flow chamber with the second distribution groove and a frusto-conical engagement surface to form an annular frusto-conical extrusion channel with the frusto-conical inner wall of the second distribution groove to receive the flowing plastic from the second distribution groove.

13. An extrusion die assembly through which a stream of flowing plastic is processed as described in claim 12 further comprising means at the second flow inlet to divide the flow of plastic substantially balanced between the third and fourth flow channels.

14. An extrusion die assembly through which a stream of flowing plastic is processed as described in claim 12 further comprising means constructed on the inner edge of the second distribution groove to restrict the flow of plastic towards the inner wall in the area of the groove inlets from flowing downstream thereof.

* * * * *